US012062864B2

(12) United States Patent
Dhara et al.

(10) Patent No.: US 12,062,864 B2
(45) Date of Patent: Aug. 13, 2024

(54) HIGH GAIN AND FAN BEAM ANTENNA STRUCTURES

(71) Applicant: MEDIATEK INC., Hsin-Chu (TW)

(72) Inventors: Debapratim Dhara, Hsinchu (TW); Shih-Chia Chiu, Hsinchu (TW); Yen-Ju Lu, Hsinchu (TW); Sheng-Mou Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 18/233,335

(22) Filed: Aug. 14, 2023

(65) Prior Publication Data

US 2024/0079787 A1 Mar. 7, 2024

Related U.S. Application Data

(62) Division of application No. 17/411,038, filed on Aug. 24, 2021, now Pat. No. 11,764,475.

(60) Provisional application No. 63/084,043, filed on Sep. 28, 2020, provisional application No. 63/084,618, filed on Sep. 29, 2020.

(51) Int. Cl.
*H01Q 9/04* (2006.01)
*H01Q 1/48* (2006.01)

(52) U.S. Cl.
CPC ............... *H01Q 9/045* (2013.01); *H01Q 1/48* (2013.01)

(58) Field of Classification Search
None
See application file for complete search history.

(56) References Cited

U.S. PATENT DOCUMENTS

| | | | | |
|---|---|---|---|---|
| 7,091,921 | B2 | 8/2006 | Ohno | |
| 9,379,438 | B1 | 6/2016 | Runyon | |
| 10,263,327 | B1 | 4/2019 | Zou | |
| 10,826,187 | B1 * | 11/2020 | Godard | H01Q 5/50 |
| 10,854,965 | B1 | 12/2020 | Livadaru | |
| 2005/0140556 | A1 | 6/2005 | Ohno | |
| 2005/0206568 | A1 | 9/2005 | Phillips | |
| 2007/0268143 | A1 | 11/2007 | Copeland | |
| 2015/0249485 | A1 | 9/2015 | Ouyang | |
| 2016/0204514 | A1 * | 7/2016 | Miraftab | H01Q 21/005 343/731 |
| 2017/0288313 | A1 | 10/2017 | Chung | |
| 2018/0190612 | A1 * | 7/2018 | Ndip | H01L 23/49838 |
| 2019/0214703 | A1 | 7/2019 | Choi | |
| 2019/0273325 | A1 * | 9/2019 | Ryoo | H01Q 21/067 |
| 2019/0363443 | A1 * | 11/2019 | Logan | H01Q 9/065 |
| 2020/0168974 | A1 * | 5/2020 | Vosoogh | H01P 1/2005 |
| 2020/0335874 | A1 * | 10/2020 | Mizusaki | H01Q 13/22 |
| 2020/0381822 | A1 * | 12/2020 | Orui | G02F 1/1343 |

FOREIGN PATENT DOCUMENTS

| | | |
|---|---|---|
| CN | 110429375 A | 11/2019 |

* cited by examiner

*Primary Examiner* — Wilson Lee
(74) *Attorney, Agent, or Firm* — Winston Hsu

(57) ABSTRACT

An antenna structure includes a radiative antenna element disposed in a first conductive layer and a reference ground plane, disposed in a second conductive layer under the first conductive layer. The radiative antenna element is loaded with a plurality of slots and is electrically connected to the reference ground plane through a plurality of vias, and the vias are placed along a first line of the radiative antenna element and the slots are placed along a second line perpendicular to the first line.

9 Claims, 10 Drawing Sheets

HIGH GAIN AND FAN BEAM ANTENNA STRUCTURES

CROSS REFERENCE TO RELATED APPLICATION

This application is a division of U.S. application Ser. No. 17/411,038, filed on Aug. 24, 2021, which claims the benefit of U.S. Provisional Application No. 63/084,043, filed on Sep. 28, 2020, and claims the benefit of U.S. Provisional Application No. 63/084,618, filed on Sep. 29, 2020. The contents of these applications are incorporated herein by reference.

BACKGROUND

Conventional millimeter wave (mm-wave) fan-beam high gain antennas are constructed with linear, series fed patch antennas. They are used to achieve low side lobe beams by controlling their feed network and the size of each patch element. However, the beam tilts with change in frequency causing variation of gain in the entire band.

Also as known in the art, a grid array antenna (GAA) structure is typically composed of rectangular meshes of microstrip lines on a dielectric substrate backed by a metallic ground plane and fed by a metal via through an aperture on the ground plane. Depending on the electrical length of the sides of the meshes, the grid array antenna may be resonant or non-resonant.

However, conventional grid array antenna does not perform well at mm-wave frequencies (e.g., 77~89 GHz). Therefore, it is desirable to provide an improved antenna structure with high-gain and desired fan beam radiation pattern at millimeter wave frequencies.

SUMMARY

It is an objective of the invention to provide an improved antenna structure with high-gain and desired fan beam radiation pattern at millimeter wave frequencies.

According to an embodiment of the invention, an antenna structure includes a radiative antenna element disposed in a first conductive layer and a reference ground plane, disposed in a second conductive layer under the first conductive layer. The radiative antenna element is loaded with a plurality of slots and is electrically connected to the reference ground plane through a plurality of vias, and the vias are placed along a first line of the radiative antenna element and the slots are placed along a second line perpendicular to the first line.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
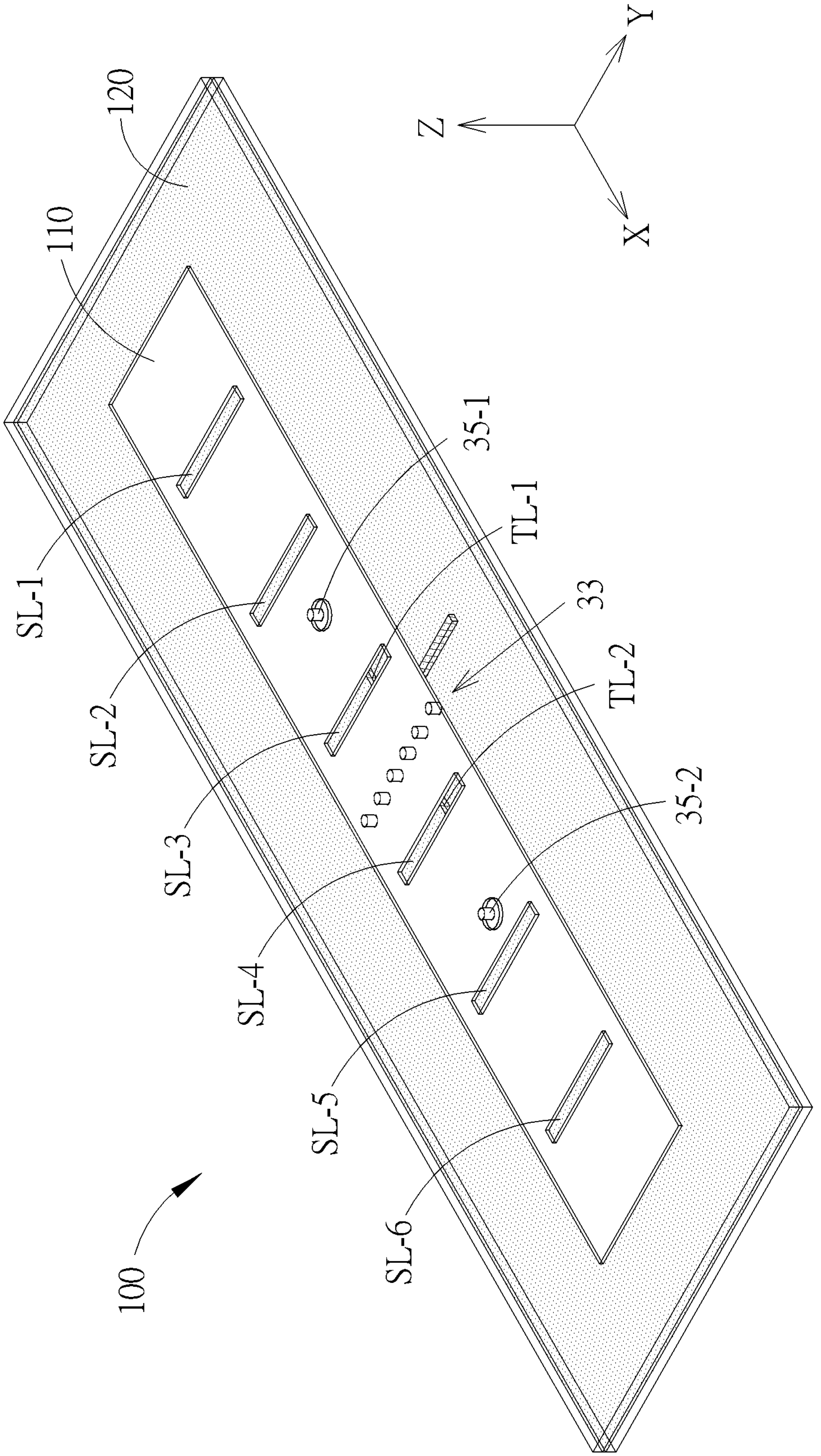
FIG. 1 is a schematic diagram of an antenna structure according to an embodiment of the invention.

In the following detailed description of embodiments of the invention, reference is made to the accompanying drawings, which form a part hereof, and in which is shown by way of illustration specific preferred embodiments in which the disclosure may be practiced.

These embodiments are described in sufficient detail to enable those skilled in the art to practice them, and it is to be understood that other embodiments may be utilized and that mechanical, structural, and procedural changes may be made without departing from the spirit and scope of the present disclosure. The following detailed description is, therefore, not to be taken in a limiting sense, and the scope of embodiments of the present invention is defined only by the appended claims.

It will be understood that, although the terms first, second, third, etc. may be used herein to describe various elements, components, regions, layers, segments and/or sections, these elements, components, regions, layers, segments and/or sections should not be limited by these terms. These terms are only used to distinguish one element, component, region, layer, segment or section from another. Thus, a first element, component, region, layer, segment or section discussed below could be termed a second element, component, region, layer, segment or section without departing from the teachings of the present inventive concept.

Spatially relative terms, such as “beneath”, “below”, “lower”, “under”, “above,” “upper,” “over” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” or “under” other elements or features would then be oriented “above” or “over” the other elements or features. Thus, the exemplary terms “below” and “under” can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

It is noted that: (i) same features throughout the drawing figures will be denoted by the same reference label and are not necessarily described in detail in every drawing that they appear in, and (ii) a sequence of drawings may show different aspects of a single item, each aspect associated with various reference labels that may appear throughout the sequence, or may appear only in selected drawings of the sequence.

The present disclosure pertains to a high gain and fan beam antenna structure and an antenna-in-package (AiP) having such antenna structure. Some suitable package types may include, but not limited to, a fan-out wafer level package (FOWLP), a flip-chip chip-scale package (FCCSP), or a semiconductor-embedded in substrate (SESUB). Further, the present disclosure may be applicable to antenna-on-board (AOB) applications. The disclosed antenna structure is suited for radar sensor for automobile applications or 5G mobile communication systems, but not limited thereto.

FIG. 1 is a schematic diagram of an antenna structure according to an embodiment of the invention. The antenna structure 100 may comprise a radiative antenna element 110 and a reference ground plane 120. The radiative antenna element 110 is disposed in a first conductive layer. The reference ground plane 120 is disposed in a second conductive layer under the first conductive layer. According to an embodiment of the invention, the radiative antenna element 110 is an electrically long (several wavelength) patch antenna operating at Transverse Magnetic $TM_{4+}1,0$ mode and comprises a plurality of etched slots, e.g. the slots SL-1~SL-(2*n). For example but not limited to, in the embodiment shown in FIG. 1, the radiative antenna element 110 is operating at $TM_{13,0}$ mode and loaded with six slots SL-1~SL-6, where n=3. It is to be noted that the number of slots etched on the radiative antenna element is not limited to six.

According to an embodiment of the invention, besides a plurality of slots etched on the radiative antenna element 110, the antenna structure 100 may further comprise a plurality of vias 33. The vias 33 may act as the shorting vias and the radiative antenna element 110 is electrically connected to the reference ground plane 120 through the vias 33. It is to be also noted that although there are six vias 33 shown in FIG. 1, the number of vias is not limited to six.

According to an embodiment of the invention, the vias 33 are placed along a first line of the radiative antenna element 110 and the slots SL-1~SL-(2*n) are placed along a second line perpendicular to the first line. In an embodiment of the invention, the first line is a center line of the patch antenna (i.e. the radiative antenna element 110). As shown in FIG. 1, a rail of vias 33 is placed along the center of the radiative antenna element 110, where the center line (or, the first line) of the radiative antenna element 110 is a virtual line crossing the central point of the radiative antenna element 110 and extended along the Y axis, and the second line of the radiative antenna element 110 is also a virtual line extended along the X axis.

According to an embodiment of the invention, as shown in FIG. 1, the 2*n slots are evenly distributed or substantially have an even distribution at two sides of the vias 33. That is, there may be n slots at each side of the vias 33.

According to an embodiment of the invention, the antenna structure 100 may further comprise a feeding network. The feeding network may comprise a pair of transmission lines disposed in a third conductive layer under the second conductive layer and a pair of differential feeding terminals. As shown in FIG. 1, the feeding terminals 35-1 and 35-2 are distributed at two sides of the vias 33, and at least a part of the transmission lines TL-1 and TL-2 are respectively routed at two sides of the vias 33.

In the embodiments of the invention, the antenna structure 100 may be configured to operate with a predetermined radio frequency (RF) signal having a RF frequency and a corresponding wavelength, for example, the guided wavelength $\lambda_g$. According to an embodiment of the invention, a distance between adjacent slots (for example, the distance from the center of one slot to the center of an adjacent slot) may be designed to be equal to or substantially equal to $\lambda_g$, and a length of at least one slot is equal to or substantially equal to $\lambda_g/2$. In the embodiments of the invention, by controlling the shape of the radiative antenna element 110 and the slots, an amplitude tapering in the radiation pattern may be obtained, which provides low side lobe level in wide frequency range. In addition, by controlling the length of each or at least one slot, a flat gain profile may be achieved in the entire frequency band.

According to an embodiment of the invention, each slot may act as a magnetic current element, along with two radiating edges of the radiative antenna element 110, producing a linear magnetic current array with high directivity. In this manner, the antenna structure 100 may excite the Transverse Magnetic $TM_{4n+1,0}$ mode and maintain a stable broadside radiation pattern over the entire band of operation.

Figure 2:
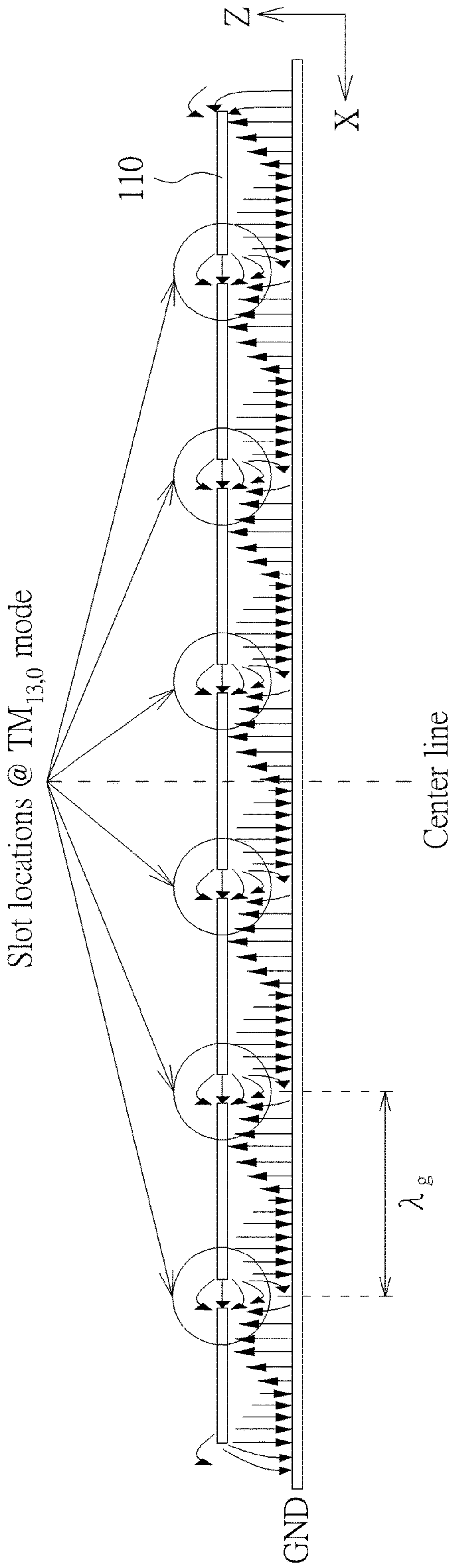
FIG. 2 is a schematic diagram showing the X-Z plane view and the electric field of the antenna structure according to an embodiment of the invention.

FIG. 2 is a schematic diagram showing the X-Z plane view and the electric field of the antenna structure 100 according to an embodiment of the invention. In the embodiment shown in FIG. 2, the radiative antenna element 110 is a patch antenna operating in $TM_{13,0}$ mode. The antenna structure comprises six one guided-wavelength apart slots (such as the SL-1~SL-6 shown in FIG. 1), where the locations of the slots at $TM_{13,0}$ mode are shown in FIG. 2, and the arrows around the radiative antenna element 110 indicates the electric fields generated by the antenna structure 100. The center line indicated in FIG. 2 shows the place where the vias 33 are disposed.

In the embodiments of the invention, since the electrical fields on aperture of the slots SL-1~SL-(2*n) will create radiation magnetic currents, by properly choosing the locations of the slot SL-1~SL-(2*n), the slots SL-1~SL-(2*n)

together with two edges of radiative antenna element 110 form an (2n+2)-element magnetic current array with high directivity. As shown in FIG. 2, an 8-element magnetic current array with high directivity is formed.

Figure 3:
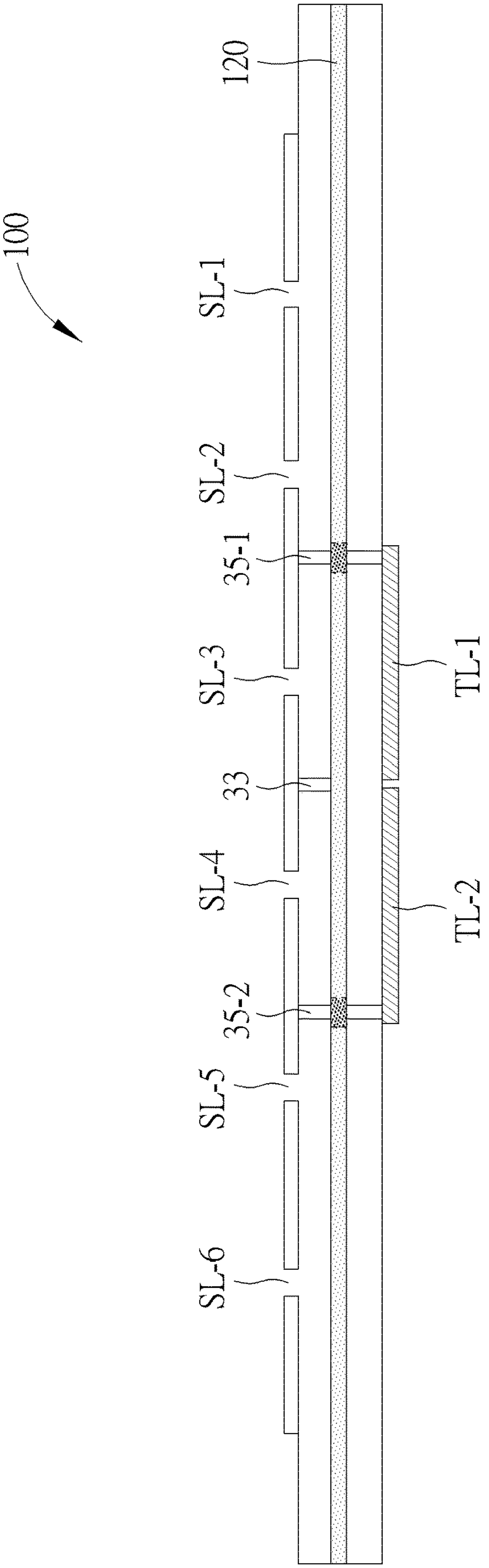
FIG. 3 is a schematic, cross-sectional diagram showing the antenna structure according to an embodiment of the invention.
Figure 4:
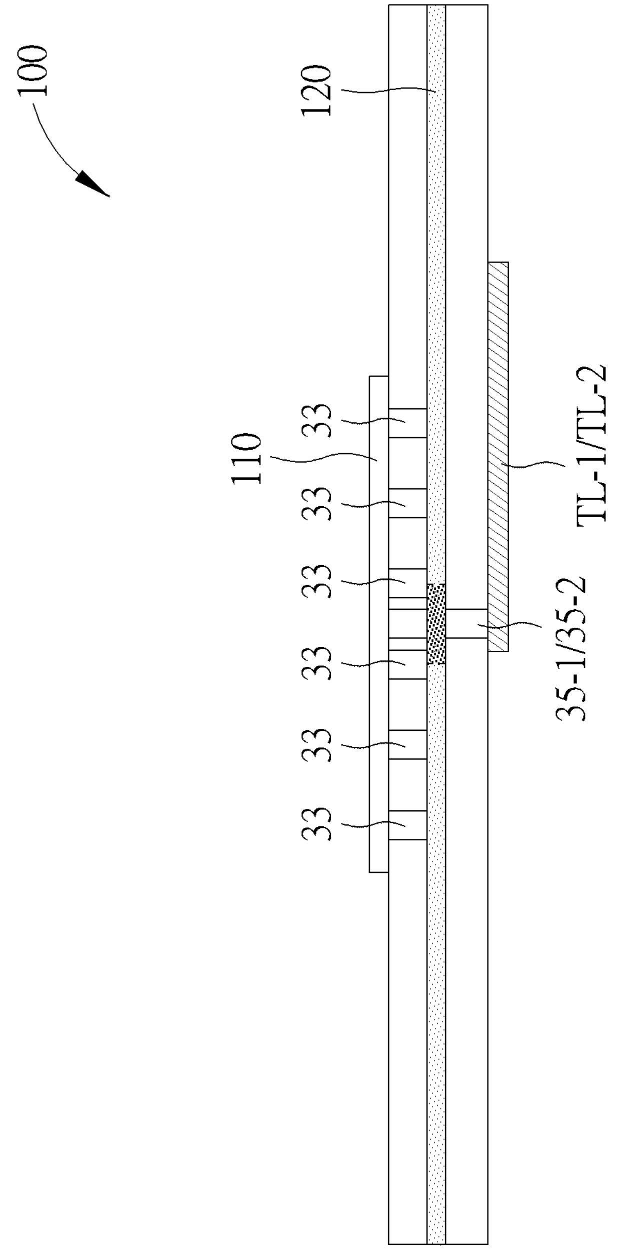
FIG. 4 is another schematic, cross-sectional diagram showing the antenna structure according to an embodiment of the invention.

FIG. 3 is a schematic, cross-sectional diagram showing the antenna structure according to an embodiment of the invention. FIG. 3 also shows the X-Z plane view of the antenna structure 100. FIG. 4 is another schematic, cross-sectional diagram showing the antenna structure according to an embodiment of the invention. FIG. 4 shows the Y-Z plane view of the antenna structure 100.

According to an embodiment of the invention, the reference ground plane 120 comprises two apertures, each for accommodating one of the feeding terminals 35-1 and 35-2. The pair of differential feeding terminals 35-1 and 35-2 is disposed to electrically couple one end of the pair of transmission lines TL-1 and TL-2 to the radiative antenna element 110. The pair of differential feeding terminals 35-1 and 35-2 passes through the apertures of the reference ground plane 120 and are not in contact with the reference ground plane 120.

An upper end of the feeding terminals 35-1 and 35-2 are electrically coupled to the radiative antenna element 110 and a lower end of the feeding terminal 35-1 and 35-2 are electrically coupled to one end of the pair of transmission lines TL-1 and TL-2, while the other end of pair of transmission lines TL-1 and TL-2 may be electrically coupled to a pad of a semiconductor chip (not shown). According to an embodiment of the invention, the semiconductor chip may be a Radio Frequency (RF) semiconductor chip, where the RF signals such as mm-wave signals to or from the radiative antenna element 110 may be transmitted through the pair of transmission lines TL-1 and TL-2 and the pair of differential feeding terminals 35-1 and 35-2.

According to an embodiment of the invention, distances from any fixed point (for example, a central point) on the center line of the radiative antenna element 110 to each feeding terminal are equal. That is, in the embodiments of the invention, the feeding terminals 35-1 and 35-2 are designed to be equidistant from the center line of the radiative antenna element 110. As shown in FIG. 2, directions of the electric field at the equidistant points from the center line of the radiative antenna element 110 are reverse. Therefore, the pair of feeding terminals 35-1 and 35-2 forms a differential feeding structure, and there will be a 180 degrees phase difference between the signals transmitted or received by radiative antenna element 110 through the feeding terminals 35-1 and 35-2. In the embodiments of the invention, the differential feeding structure is applied to excite the $TM_{4n+1,0}$ mode and maintains a stable broadside radiation pattern over the entire band of operation.

Figure 5:
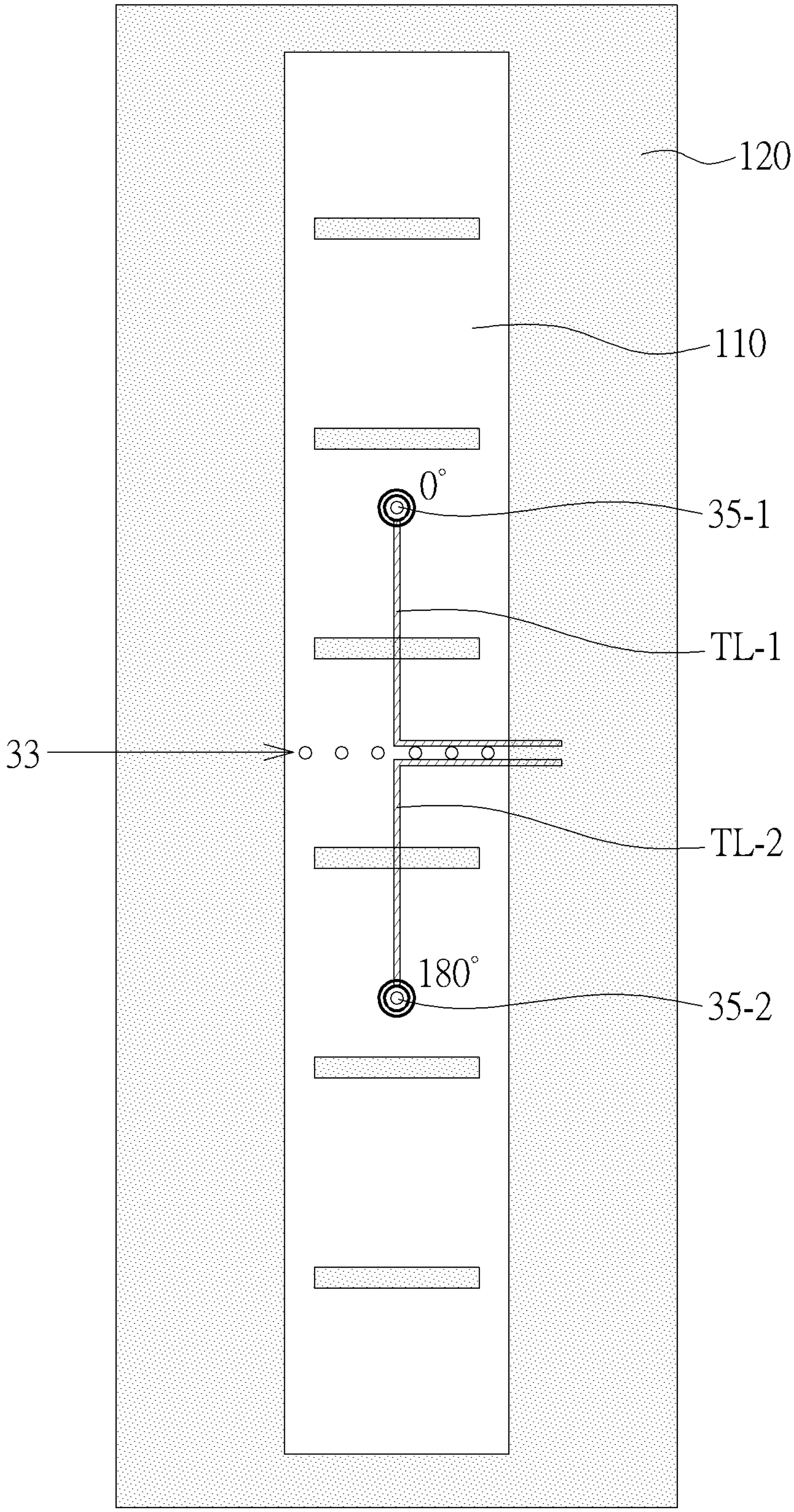
FIG. 5 is a schematic top view of the proposed antenna structure according to an embodiment of the invention.

FIG. 5 is a schematic top view of the proposed antenna structure according to an embodiment of the invention, which is a perspective showing an implementation of the transmission lines. In the embodiment shown in FIG. 5, a differential line pair is utilized as the transmission lines TL-1 and TL-2 in the feeding network, so as to implement the differential feeding structure with the feeding terminals 35-1 and 35-2. In addition, the two feeding terminals (or, feeding vias, which may be metal vias) 35-1 and 35-2 with 180 degrees phase difference are placed at the two sides of vias (e.g. shorting vias) 33 and connected to the radiative antenna element 110 and the transmission lines TL-1 and TL-2.

Figure 6:
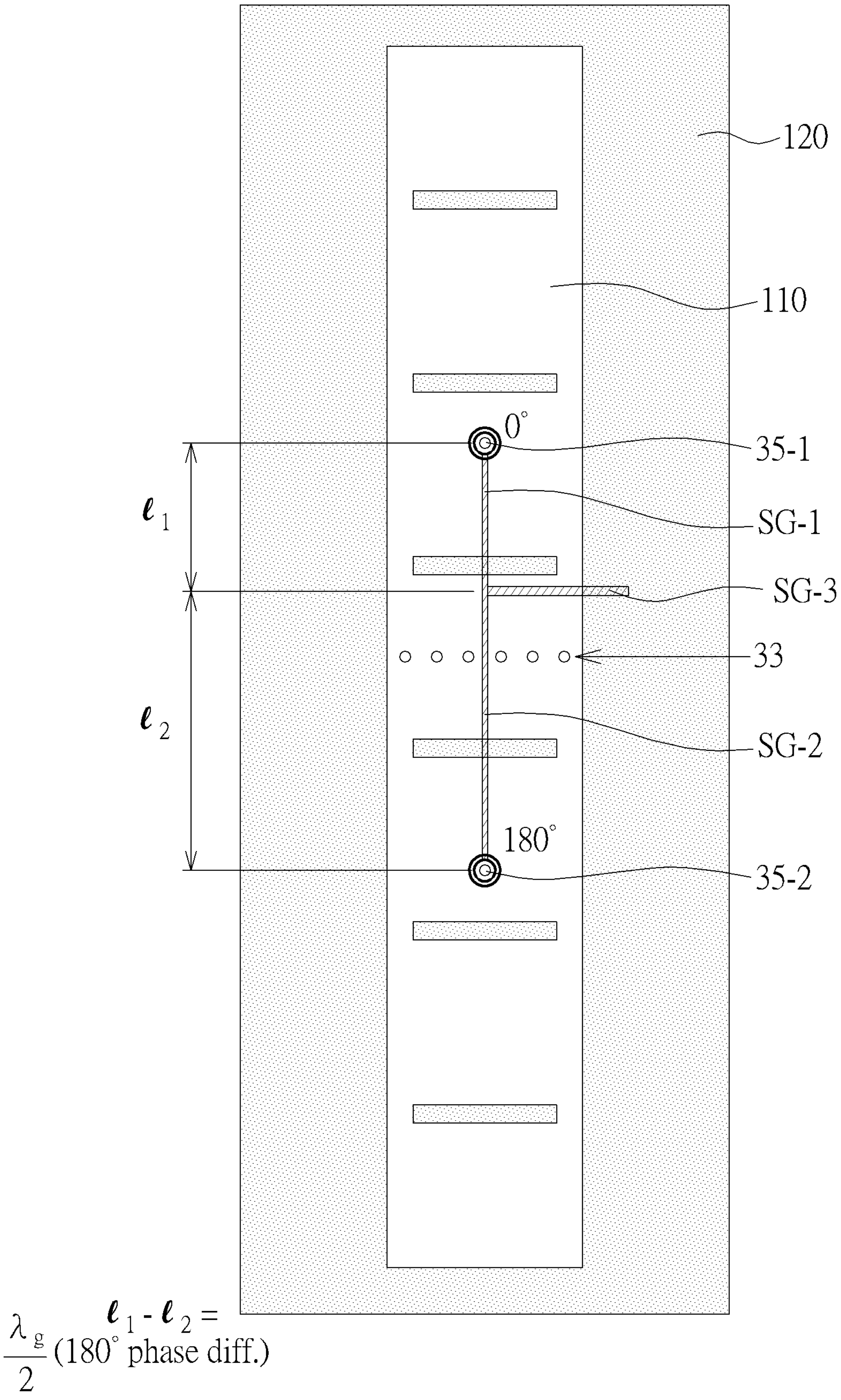
FIG. 6 is a schematic top view of the proposed antenna structure according to another embodiment of the invention.

FIG. 6 is a schematic top view of the proposed antenna structure according to another embodiment of the invention, which is a perspective showing another implementation of the transmission lines. In the embodiment shown in FIG. 6, two delay lines are utilized as the pair of transmission lines in the feeding network, so as to implement the differential feeding structure with the feeding terminals 35-1 and 35-2. In addition, the two feeding terminals (or, feeding vias, which may be metal vias) 35-1 and 35-2 with 180 degrees phase difference are placed at the two sides of vias (e.g. shorting vias) 33 and connected to the radiative antenna element 110 and the pair of transmission lines.

In addition, the pair of transmission lines may comprise a first transmission line segment SG-1, a second transmission line segment SG-2 and a third transmission line segment SG-3. One end of the first transmission line segment SG-1 is electrically coupled to the lower end of the feeding terminal 35-1 and one end of the second transmission line segment SG-2 is electrically coupled to the lower end of the feeding terminal 35-2. Another end of the first transmission line segment SG-1 is connected to the third transmission line segment SG-3 to form a delay line as the transmission line TL-1, and another end of the second transmission line segment SG-2 is connected to the third transmission line segment SG-3 to form another delay line as the transmission line TL-2. A difference between a length $l_1$ of the first transmission line segment SG-1 and a length $l_2$ of the second transmission line segment SG-2 may be designed to be equal to or substantially equal to $\lambda_g/2$, so as to have a 180 degrees phase difference.

Figure 7:
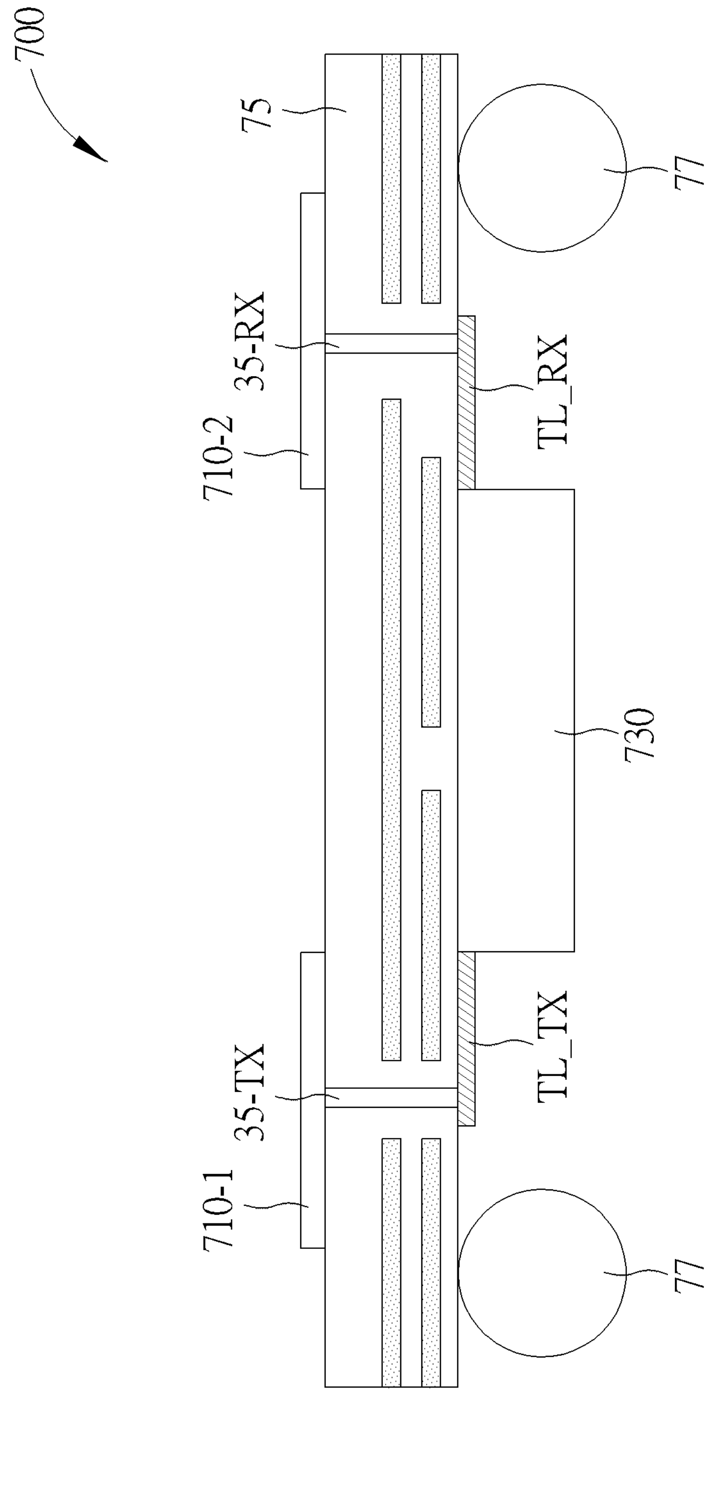
FIG. 7 is a schematic, cross-sectional diagram showing an exemplary antenna-in-packages having the proposed antenna structure according to one embodiment of the invention.

FIG. 7 is a schematic, cross-sectional diagram showing an exemplary antenna-in-packages (AiP) having the proposed antenna structure according to one embodiment of the invention. The AiP 700 may comprise one or more antenna structures, such as the proposed antenna structure 100 illustrated above, and a semiconductor chip, such as the RF semiconductor chip 730.

Two radiative antenna elements 710-1 and 710-2 are comprised in the antenna structure of the AiP 700 and disposed in a first conductive layer. In FIG. 7, the schematic side views of the radiative antenna elements 710-1 and 710-2 are shown, which are the Y-Z plane views as illustrated above. In this embodiment, the radiative antenna element 710-1 may act as a transmitting (TX) antenna and the radiative antenna element 710-2 may act as a receiving (RX) antenna.

The radiative antenna elements 710-1 and 710-2 may both be loaded with a plurality of slots and may both be electrically connected to the reference ground plane GND through a plurality of vias as illustrated above.

One or more reference ground planes GND are comprised in the antenna structure of the AiP 700 and disposed in at least a second conductive layer under the first conductive layer. Two feeding networks are comprised in the antenna structure of the AiP 700. The RF semiconductor chip 730 is electrically coupled to the antenna structure of the AiP 700 through the feeding networks. Each feeding network may comprise a pair of transmission lines disposed in a third conductive layer under the second conductive layer and a pair of differential feeding terminals. Since FIG. 7 shows the schematic side views of the feeding networks, only one feeding terminal and a part of one transmission line in each feeding network are shown. As shown in FIG. 7, the feeding terminal 35 TX is electrically connecting one end of the transmission line TL TX to the radiative antenna element 710-1 and the feeding terminal 35 RX is electrically connecting one end of the transmission line TL RX to the radiative antenna element 710-2.

It is to be noted that, besides the first, second and third conductive layers, one or more other conductive layers may also be implemented in the antenna structure of the AiP 700 without departing form the scope of the invention. In addition, the AiP 700 may further comprise a substrate 75 and the one or more antenna structures may be disposed in and on the substrate 75. The substrate 75 may be a ceramic substrate, a semiconductor substrate, a dielectric substrate, a glass substrate, but is not limited thereto. According to one embodiment, the substrate 75 may be a package substrate or a printed circuit board (PCB) comprising, for example, FR4 materials or high-performance millimeter-wave PCB materials, but is not limited thereto. In addition, one or more conductive elements 77, such as solder balls, copper pillars or plug-in terminals may be provided around the RF semiconductor chip 730.

Figure 8:
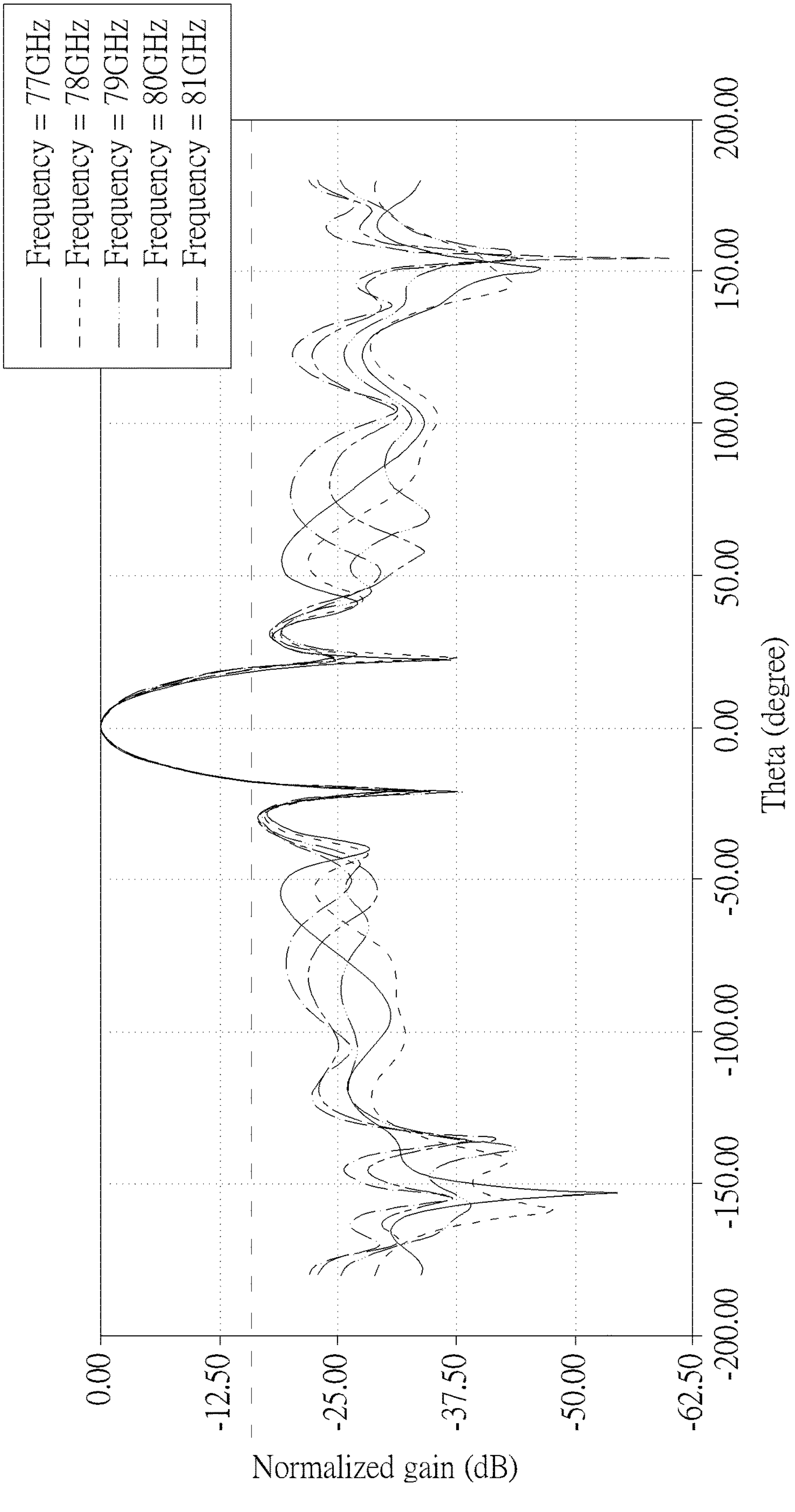
FIG. 8 is a schematic diagram showing the radiation pattern of the proposed antenna structure in the Electric-plane (E-plane) according to an embodiment of the invention.
Figure 9:
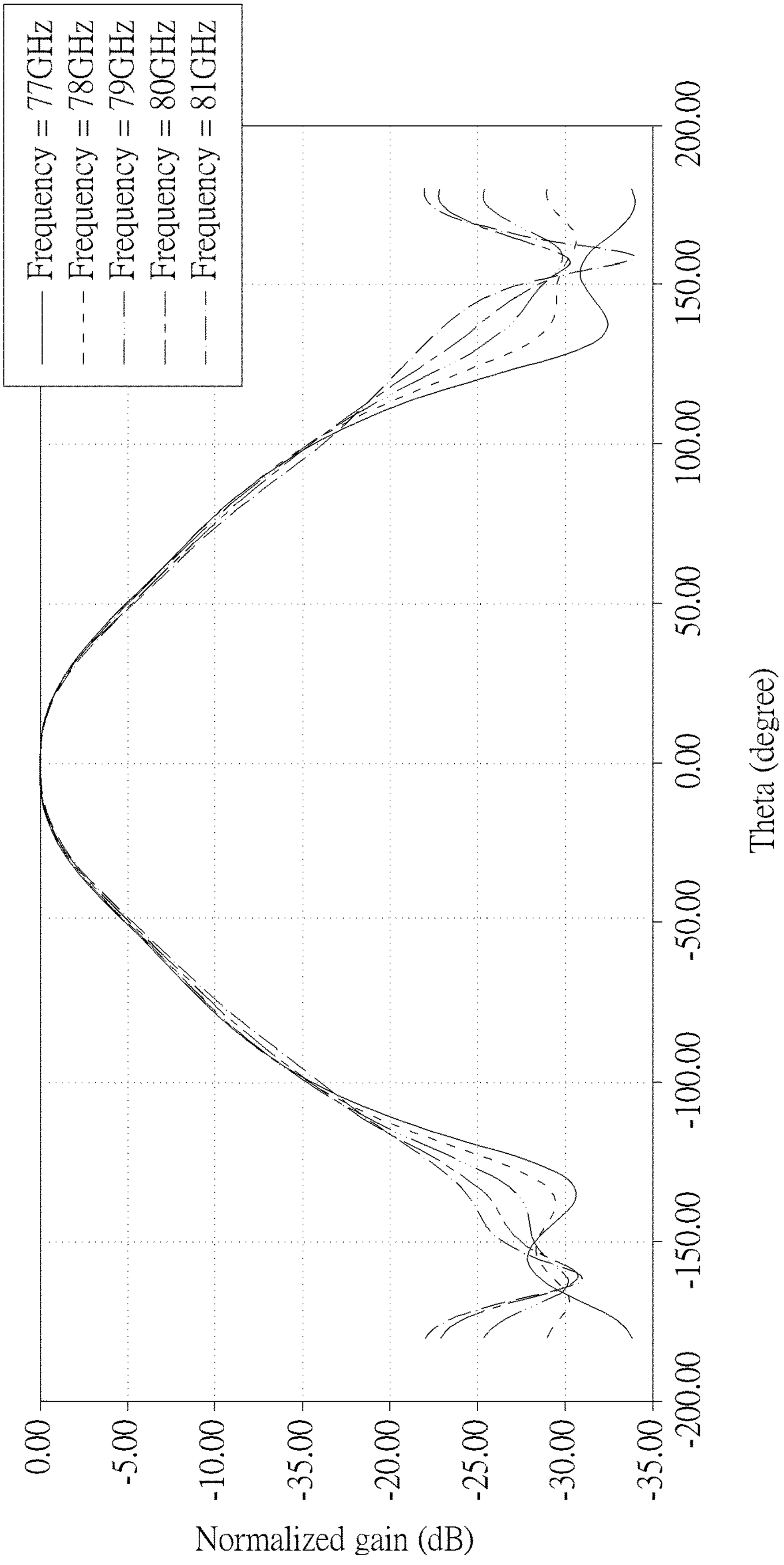
FIG. 9 is a schematic diagram showing the radiation pattern of the proposed antenna structure in the magnetic-plane (H-plane) according to an embodiment of the invention.

FIG. 8 is a schematic diagram showing the radiation pattern of the proposed antenna structure in the Electric-plane (E-plane) according to an embodiment of the invention. FIG. 9 is a schematic diagram showing the radiation pattern of the proposed antenna structure in the magnetic-plane (H-plane) according to an embodiment of the invention. FIG. 8 and FIG. 9 show the normalize gain plots where each radiation pattern is normalized by the maximum gain. As shown in FIG. 8 and FIG. 9, the proposed antenna structure performs well at mm-wave frequencies (e.g., 77~89 GHz). In addition, a stable broadside radiation pattern over the entire band of operation can be maintained. In addition, since the radiation beam width in E-plane is narrow and the radiation beam width in H-plane is wide, the fan beam antenna requirement is achieved.

According to an embodiment of the invention, the shape of radiative antenna element may also be flexibly designed, and the length and the width of each slot may be varied and tuned to obtain flat gain and low side lobe level.

Figure 10:
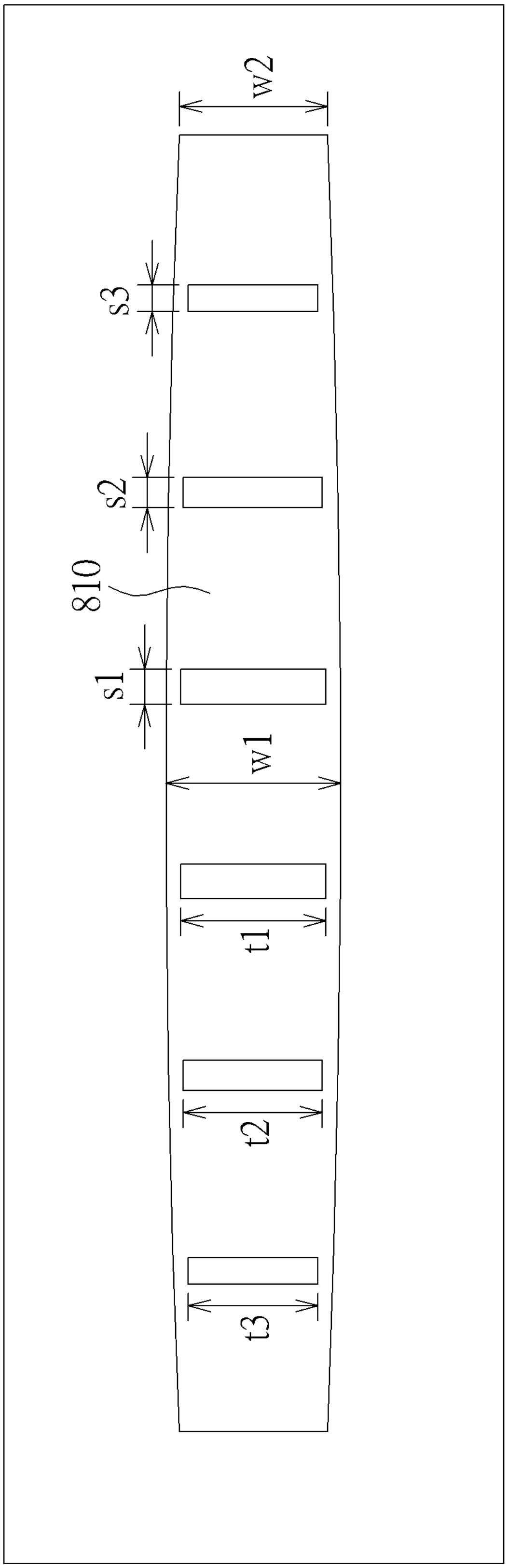
FIG. 10 is a schematic diagram showing a different shape of radiative antenna element implemented in the antenna structure according to an embodiment of the invention.

FIG. 10 is a schematic diagram showing a different shape of radiative antenna element implemented in the antenna structure according to an embodiment of the invention. In FIG. 10, the width w1 at the center of the radiative antenna element 810 and the width w2 at the edge of the radiative antenna element 810 may be different, where w1>w2 is designed, so as to form a tapered patch antenna. In addition, the length and the width of the etched slots may also be different. For example, in FIG. 10, the length t1 of the slot closest to the center line is greater than the length t2 of the adjacent slot (the sandwiched slot), and the length t2 of the sandwiched slot is greater than the length t3 of the slot closest to the edge of the radiative antenna element 810. For another example, in FIG. 10, the width s1 of the slot closest to the center line is greater than the width s2 of the adjacent slot (the sandwiched slot), and the width s2 of the sandwiched slot is greater than the width s3 of the slot closest to the edge of the radiative antenna element 810. By adjusting the length and the width of each slot, the energy radiated from each aperture will be adjusted, thereby suppressing the side lobe level.

According to another embodiment of the invention, the proposed antenna structure may also be applied in an array environment, in which a plurality of the proposed antenna structure may be disposed in proximity to form an antenna array. For example, in one embodiment of the invention, two (or more than two) proposed antenna structures may be placed half wavelength apart, while still keeping good isolation in the entire band.

In summary, the proposed antenna structure is a compact and low-profile design for high gain, low side-lobe and with fan beam pattern. A rail of shorting via is placed along the center of the radiative antenna element, which can be utilized to suppress any even order TM mode to be excited in the entire structure and isolate two feeding terminals. In addition, the proposed antenna structure is differentially fed and the differential feeding structure is applied to excite the $TM_{4n+1,0}$ mode and maintains a stable broadside radiation pattern over the entire band of operation. In addition, by controlling the shape of the radiative antenna element and the slots, amplitude tapering in the radiation pattern may be obtained, which provides low side lobe level in wide frequency range. The shape of the radiative antenna element may also be modified from rectangular to trapezoidal, which may reduce the side lobe level. In addition, by controlling the length of each or at least one slot, a flat gain profile may be achieved in the entire frequency band.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna structure, comprising:

a radiative antenna element, disposed in a first conductive layer; and a reference ground plane, disposed in a second conductive layer under the first conductive layer, wherein the radiative antenna element is loaded with a plurality of slots and is electrically connected to the reference ground plane through a plurality of vias, and wherein the vias are placed along a first line of the radiative antenna element and the slots are placed along a second line perpendicular to the first line.

2. The antenna structure of claim 1, wherein the first line is a center line of the radiative antenna element and the slots are evenly distributed at two sides of the vias.

3. The antenna structure of claim 1, wherein the antenna structure is configured to operate with a predetermined radio frequency (RF) signal having a RF frequency and a corresponding wavelength $\lambda_g$, and wherein a distance between adjacent slots is equal to or substantially equal to $\lambda_g$.

4. The antenna structure of claim 3, wherein a length of at least one slot is equal to or substantially equal to $\lambda_g/2$.

5. The antenna structure of claim 1, further comprising:

a feeding network, comprising a pair of transmission lines disposed in a third conductive layer under the second conductive layer and a pair of differential feeding terminals, wherein the pair of differential feeding terminals is disposed to electrically couple one end of the pair of transmission lines to the radiative antenna element.

6. The antenna structure of claim 5, wherein the pair of transmission lines is a differential line pair.

7. The antenna structure of claim 5, wherein the pair of differential feeding terminals are distributed at two sides of the vias.

8. The antenna structure of claim 5, wherein the antenna structure is configured to operate with a predetermined radio frequency (RF) signal having a RF frequency and a corresponding wavelength $\lambda_g$, the pair of transmission lines comprises a first transmission line segment and a second transmission line segment, and wherein a difference between a length of the first transmission line segment and a length of the second transmission line segment is equal to or substantially equal to $\lambda_g/2$.

9. The antenna structure of claim 1, wherein the radiative antenna element is a patch antenna.

* * * * *